(12) United States Patent
Yamaguchi (10) Patent No.: US 6,869,017 B2
(45) Date of Patent: Mar. 22, 2005

(54) CARD CONNECTOR

(75) Inventor: Katsumi Yamaguchi, Saitama (JP)

(73) Assignee: Tyco Electronics AMP K.K., Kanagawa-ken (JP)

( * ) Notice: Subject to any disclaimer, the term of this patent is extended or adjusted under 35 U.S.C. 154(b) by 0 days.

(21) Appl. No.: 10/657,395

(22) Filed: Sep. 8, 2003

(65) Prior Publication Data

US 2004/0050938 A1 Mar. 18, 2004

(30) Foreign Application Priority Data

Sep. 9, 2002 (JP) ...................................... 2002-263254

(51) Int. Cl.[7] .............................................. G06K 13/06
(52) U.S. Cl. ....................... 235/483; 235/486; 235/475
(58) Field of Search ................................ 235/483, 486, 235/475; 439/159, 630

(56) References Cited

U.S. PATENT DOCUMENTS

| | | | | |
|---|---|---|---|---|
| 5,564,936 A | * | 10/1996 | David et al. ................. | 439/159 |
| 5,917,177 A | * | 6/1999 | Owa et al. .................... | 235/486 |
| 5,949,048 A | * | 9/1999 | Nakamura et al. ........... | 235/486 |
| 5,967,810 A | * | 10/1999 | Spickler et al. .............. | 439/159 |
| 6,033,243 A | * | 3/2000 | Kajiura ......................... | 439/159 |
| 6,036,513 A | * | 3/2000 | Nishioka ...................... | 439/159 |
| 6,089,890 A | * | 7/2000 | Oguchi et al. ............... | 439/159 |
| 6,095,835 A | * | 8/2000 | Oguchi ......................... | 439/159 |
| 6,113,403 A | * | 9/2000 | Oguchi ......................... | 439/159 |
| 6,234,844 B1 | * | 5/2001 | Somerville et al. .......... | 439/630 |
| 6,405,928 B1 | * | 6/2002 | Muramatsu et al. ......... | 235/475 |
| 6,623,304 B2 | * | 9/2003 | Harasawa et al. ........... | 439/630 |

FOREIGN PATENT DOCUMENTS

| | | | | |
|---|---|---|---|---|
| JP | 02-035584 | | 2/1990 | .......... G06K/17/00 |
| JP | 11-039435 | | 2/1999 | .......... G06K/13/06 |

* cited by examiner

Primary Examiner—Michael G. Lee
Assistant Examiner—Uyen-Chau N. Le
(74) Attorney, Agent, or Firm—Barley Snyder LLC (57) ABSTRACT

A card connector has a first receiving slot for receiving a first card and a second receiving slot for receiving a second card having a thickness smaller than the first card. A stopper member is supported in the first receiving slot by a supporting shaft and pivots between a first position where the stopper member blocks the first receiving slot to prevent advancement of the first or second card and a second position where the first receiving slot is unblocked. A cam member is pivotally supported in the card receiving slot by a supporting shaft arranged perpendicular to the supporting shaft of the stopper member and has a claw that abuts the stopper member to prevent the stopper member from pivoting to the second position. The cam member has a cam surface that releases the claw from the stopper member when the cam surface is cam-engaged by the first card.

14 Claims, 11 Drawing Sheets

CARD CONNECTOR

FIELD OF THE INVENTION

The invention relates to a card connector that has at least two receiving slots wherein at least one of the slots is designed to receive a card with a small thickness, such as, an International Standards Organization (ISO) standard IC card or smart card, and at least one of the slots is designed to receive a card with a large thickness, such as, a Personal Computer Memory Card International Association (PCMCIA) standard IC card.

BACKGROUND OF THE INVENTION

Figure 9A:
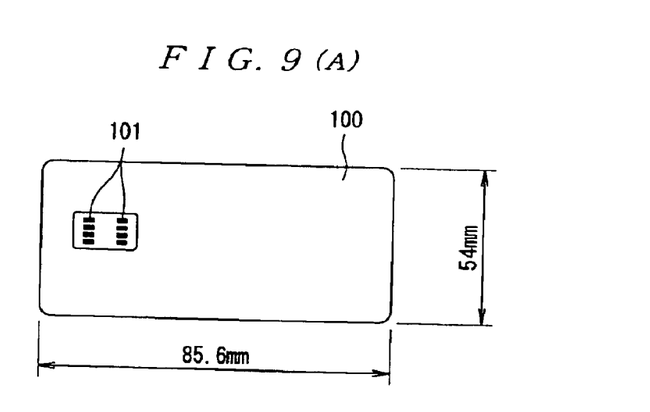
FIG. 9(A) is a plan view.
Figure 9B:
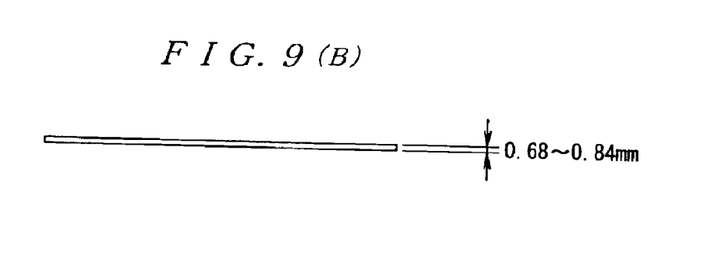
FIG. 9(B) is a side view.
Figure 10:
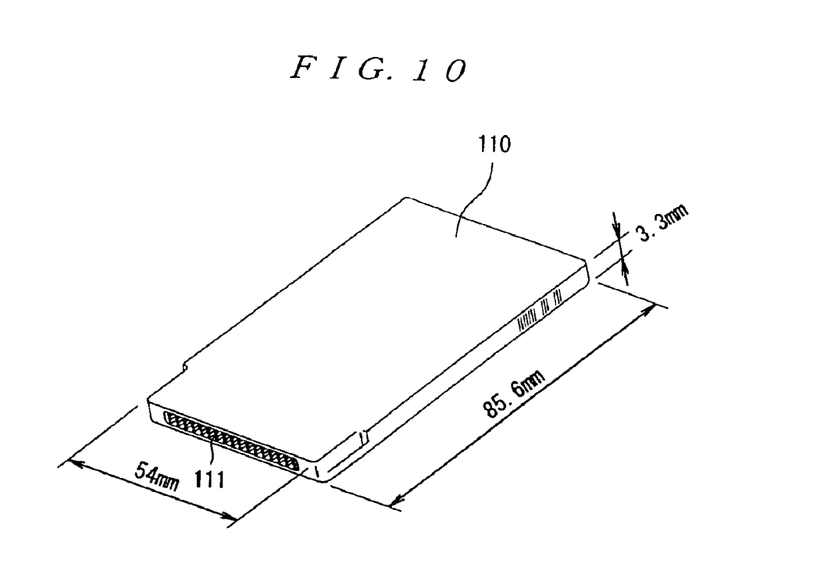
FIG. 10 is a perspective view of a type I PCMCIA standard IC card.

As a result of advancements in computer technology, there has been a rapid development of high performance compact computers, such as, notebook-type personal computers, and computers with card connectors that have two receiving slots designed for receiving ISO standard IC cards or smart cards (hereafter "smart cards") and PCMCIA standard IC cards (hereafter "IC cards"). As shown in FIG. 9, the smart cards 100 have a plurality of terminal parts 101 on a main surface of the smart card 100 and a depth of 85.6 mm, a width of 54 mm, and a thickness of 0.68 to 0.84 mm. There are three types of IC cards. As shown in FIG. 10, type IIC cards 110 have a connector part 111 on one end portion of the IC card 110 and have a depth of 85.6 mm, a width of 54 mm, and a thickness of 3.3 mm. The type IIC cards 110 are used as semiconductor memory cards. Type II IC cards have a depth of 85.6 mm, a width of 54 mm, and a thickness of 5 mm. The type II IC cards are used as modem cards. Type III IC cards have a depth of 85.6 mm, a width of 54 mm and a thickness of 10.5 mm. The type III IC cards are used as hard disk cards.

When the dimensions of the smart card 100 and the dimensions of the IC cards are compared, it is apparent that while the depth and width of the smart card 100 and the IC cards are the same that the thickness of the cards vary. The smart card 100 is comparatively thinner than the three types of IC cards. As a result, the height in a direction of thickness of the receiving slot that receives the smart card 100 is configured to be small, and the height in the direction of thickness of the receiving slot that receives one of the IC cards is configured to be large to facilitate receipt of the respective card in the card connector.

If a user inserts the smart card 100 with the smaller thickness into the receiving slot used for the IC cards with the larger thickness, there is a danger that a plurality of pin contacts arranged in the larger receiving slot used for the IC cards or a portion of the housing, etc., will be bent and/or damaged by an end portion of the smart card 100. Additionally, if the plurality of pin contacts are not damaged, the user may mistakenly believe that the smart card 100 has been inserted into the appropriate receiving slot and will be unable to operate the computer normally when a power supply of the computer is switched on.

Figure 11:
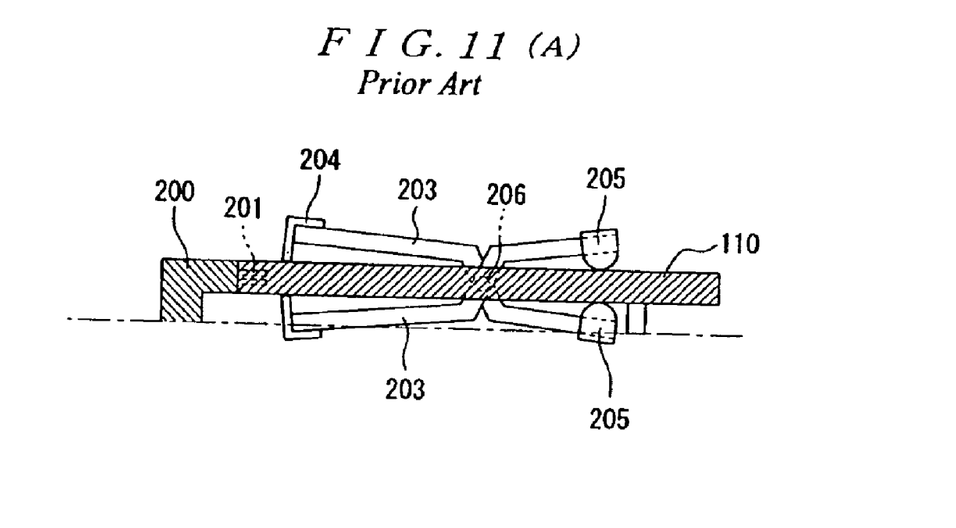
FIG. 11 shows a conventional IC card socket.

Several attempts have been made to prevent the erroneous insertion of the smart card into the larger receiving slot. For example, FIG. 11 shows an IC card socket 200 that prevents the erroneous insertion of a thin card into a receiving slot used for cards with a large height (see JP11-39,435A). The IC card socket 200 comprises a plurality of pin contacts 201 electrically connected to an IC card 110. A pair of guide rails 202 guide the insertion of the IC card 110 toward the pin contacts 201. A set of upper and lower thickness detecting levers 203 are disposed on one of the guide rails 202 and are pivotally supported by a pivoting shaft 206. Inserted-object clamping parts 205 are disposed on end portions of the respective thickness detecting levers 203 and are located on a side of a card insertion opening to detect the thickness of objects that are inserted into the guide rails 202. Shutter parts 204 are disposed on the end portions of the respective thickness detecting levers 203 and are located on the side of the pin contacts 201.

When an IC card 110 having a large thickness is inserted into the IC card socket 200 along the guide rails 202, the inserted-object clamping parts 205 open, and the upper and lower thickness detecting levers 203 accordingly pivot about the pivoting shaft 206, as shown in FIG. 11(A). When the thickness detecting levers 203 open, the shutter parts 204 also open so that the IC card 110 may be connected to the pin contacts 201. On the other hand, when a smart card 100 with a small thickness is inserted along the guide rails 202, the upper and lower thickness detecting levers 203 do not open, as shown in FIG. 11(B). Accordingly, the shutter parts 204 remain closed, such that the insertion of the smart card 100 is checked by the shutter parts 204.

Figure 12:
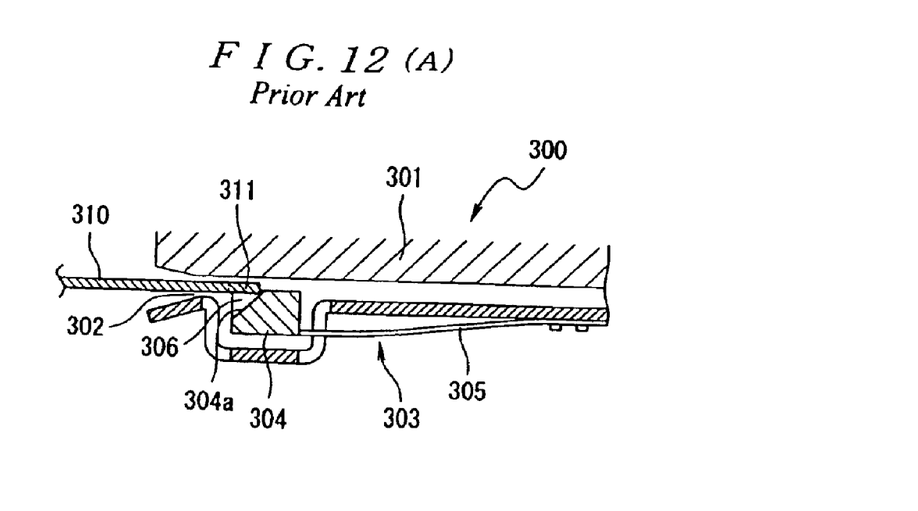
FIG. 12 shows a conventional IC cartridge reader.

FIG. 12 shows another example of an IC cartridge reader 300 with means for preventing the erroneous insertion of an inappropriate IC cartridge (see JP2-35,584A). The IC cartridge reader 300 comprises a chassis 301 with an IC cartridge insertion opening 302 and a shutter means 303. The shutter means 303 consists of a shutter main body 304 and a spring member 305 disposed in a vicinity inside of the IC cartridge insertion opening 302. The spring member 305 supports the shutter main body 304 so that the shutter main body 304 can open and close. An erroneous insertion preventing projection 306 is formed on the shutter main body 304. A cut-out 311 is formed in an end portion of an IC cartridge 310 in a position corresponding to the erroneous insertion preventing projection 306.

As shown in FIG. 12 (A), when an appropriate IC cartridge 310 is inserted in the IC cartridge insertion opening 302, the erroneous insertion preventing projection 306 passes through an interior of the cut-out 311, and a tip end of the IC cartridge 310 contacts the shutter main body 304. Since an inclined surface 304a is formed on the shutter main body 304, a down oriented component force of the insertion force of the IC cartridge 310 is generated by the inclined surface 304a such that the shutter main body 304 is driven downward against the elasticity of the spring member 305 to allow insertion of the IC cartridge 310. On the other hand, when an inappropriate IC cartridge 310, e.g. an IC cartridge 310 which does not have a cut-out 311 or an IC cartridge 310 in which the position of the cut-out 311 is different, is inserted into the IC cartridge insertion opening 302, a tip end of the IC cartridge 310 contacts the erroneous insertion preventing projection 306, as shown in FIG. 12 (B). Since the erroneous insertion preventing projection 306 is formed perpendicular to the direction of insertion of the IC cartridge 310, no downward-oriented component force is generated in the shutter main body 304, and the shutter main body 304 is not opened. As a result, the insertion of inappropriate IC cartridges 310 is prevented.

Several problems and disadvantages, however, have been encountered with the IC card socket 200, shown in FIG. 11, and the IC cartridge reader 300, shown in FIG. 12. In the case of the IC card socket 200, the mechanism for preventing the erroneous insertion of the thin cards is effective only in cases where there is only one receiving slot. The mechanism can not be applied to card connectors having at least two receiving slots disposed adjacent to each other above and below wherein one of the receiving slots receives the thin cards and the other of the slots receives the thick cards. Further, the construction of the mechanism is complicated so that not only is the manufacturing cost of the IC card socket 200 high, but the IC card socket 200 is also bulky. In the case of the IC cartridge reader 300, the IC cartridge reader 300 can not be applied to ordinary IC cards and smart cards, because a special IC cartridge 310 which has a cut-out 311 formed in the end portion is required to prevent erroneous insertion of the cards.

SUMMARY OF THE INVENTION

It is an object of the invention to provide a card connector with a first receiving slot for receiving IC cards and a second receiving slot for receiving smart cards having a thickness smaller than the IC cards, wherein erroneous insertion of the smart card into the first receiving slot designed for receipt of the IC cards is prevented by means of a device with a simple construction and a low height and wherein the device may be applied to ordinary cards without any modifications thereto.

This and other objects are achieved by a card connector having a first receiving slot for receiving a first card, and a second receiving slot for receiving a second card that has a thickness smaller than the first card. A stopper member is supported in the first receiving slot by a supporting shaft. The stopper member pivots between a first position where the stopper member blocks the first receiving slot to prevent advancement of the first or second card, and a second position where advancement of the first or second card is unblocked. A cam member has a claw that abuts the stopper member to prevent the stopper member from pivoting to the second position. The cam member has a cam surface that releases the claw from the stopper member when cam-engaged by the first card.

BRIEF DESCRIPTION OF THE DRAWINGS

FIG. 1 shows an embodiment of a card connector according to the invention.

FIG. 2(A) is a right-side view of the card connector; FIG. 2(B) is a left-side view of the card connector;

FIG. 8 shows operating states of a thin card advance checking device.

FIG. 9 shows an ISO standard smart card.

FIG. 11(A) is a sectional view illustrating operation in a case where a thick IC card is inserted; FIG. 11(B) is a sectional view illustrating operation in a case where a thin smart card is inserted; FIG. 12(A) is a sectional view illustrating operation in a case where an appropriate IC cartridge is inserted; FIG. 12(B) is a sectional view illustrating operation in a case where an inappropriate IC cartridge is inserted.

DETAILED DESCRIPTION OF THE INVENTION

Figure 1A:
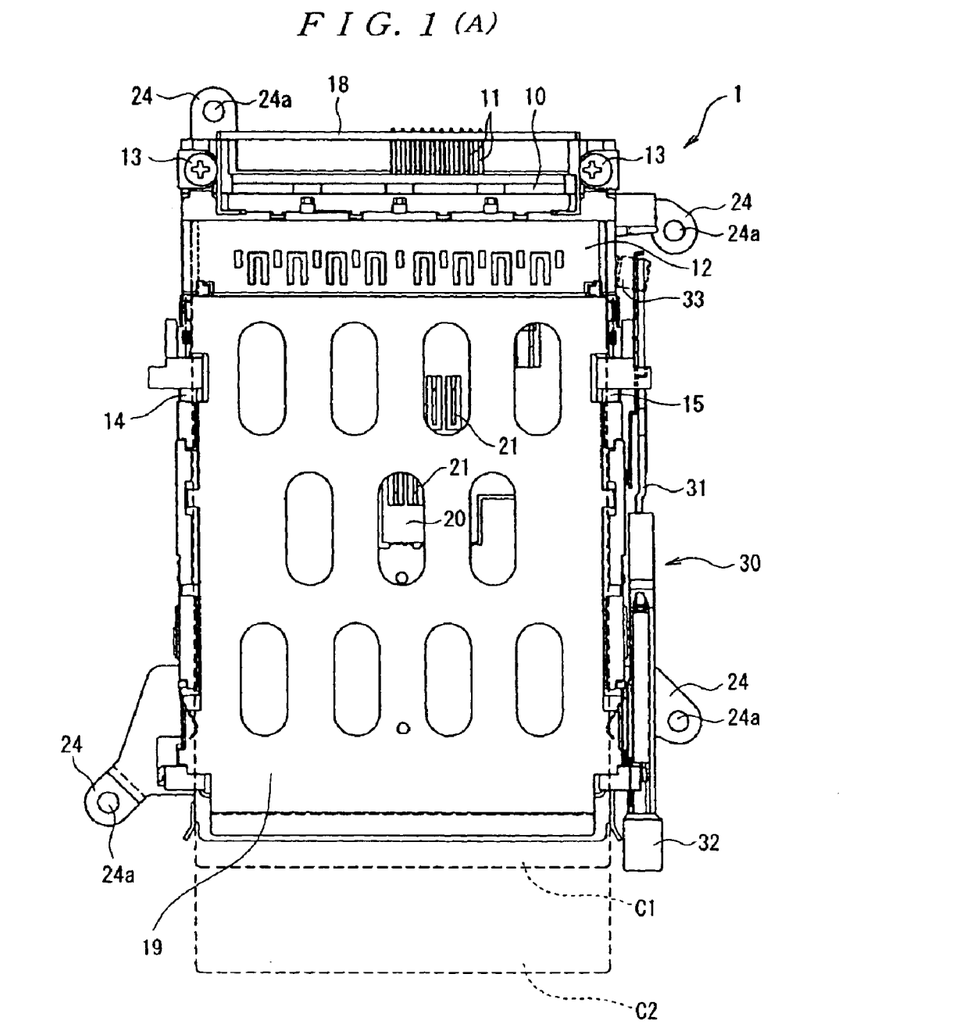
FIG. 1(A) is a plan view of the card connector.
Figure 1B:
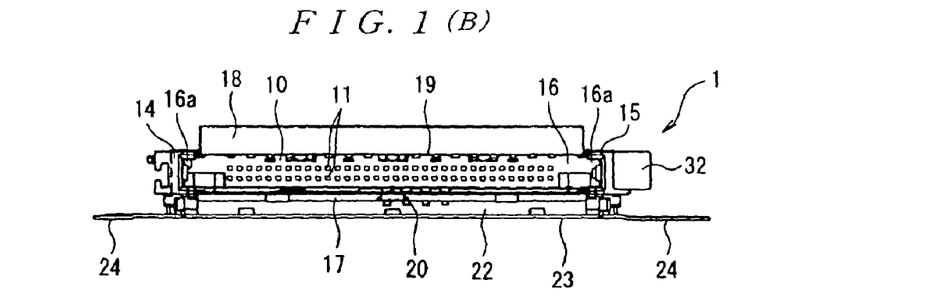
FIG. 1(B) is a front view of the card connector.
Figure 2:
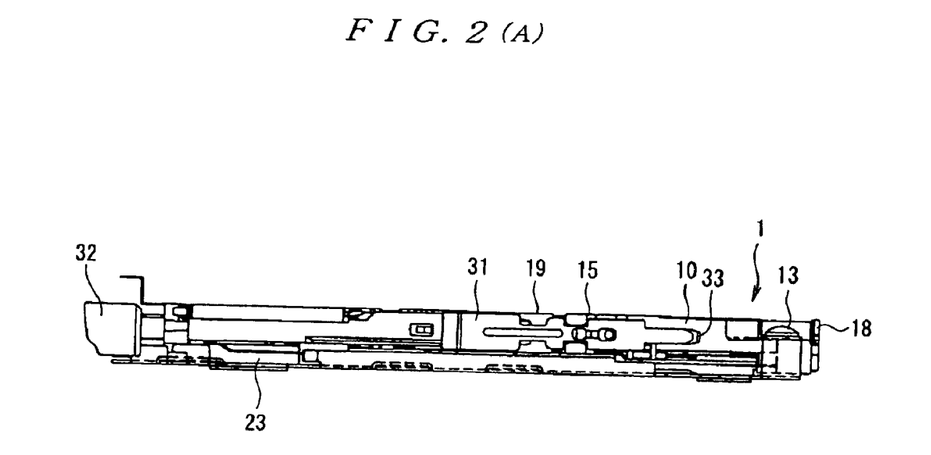
FIG. 2 shows the card connector of FIG. 1.
Figure 3:
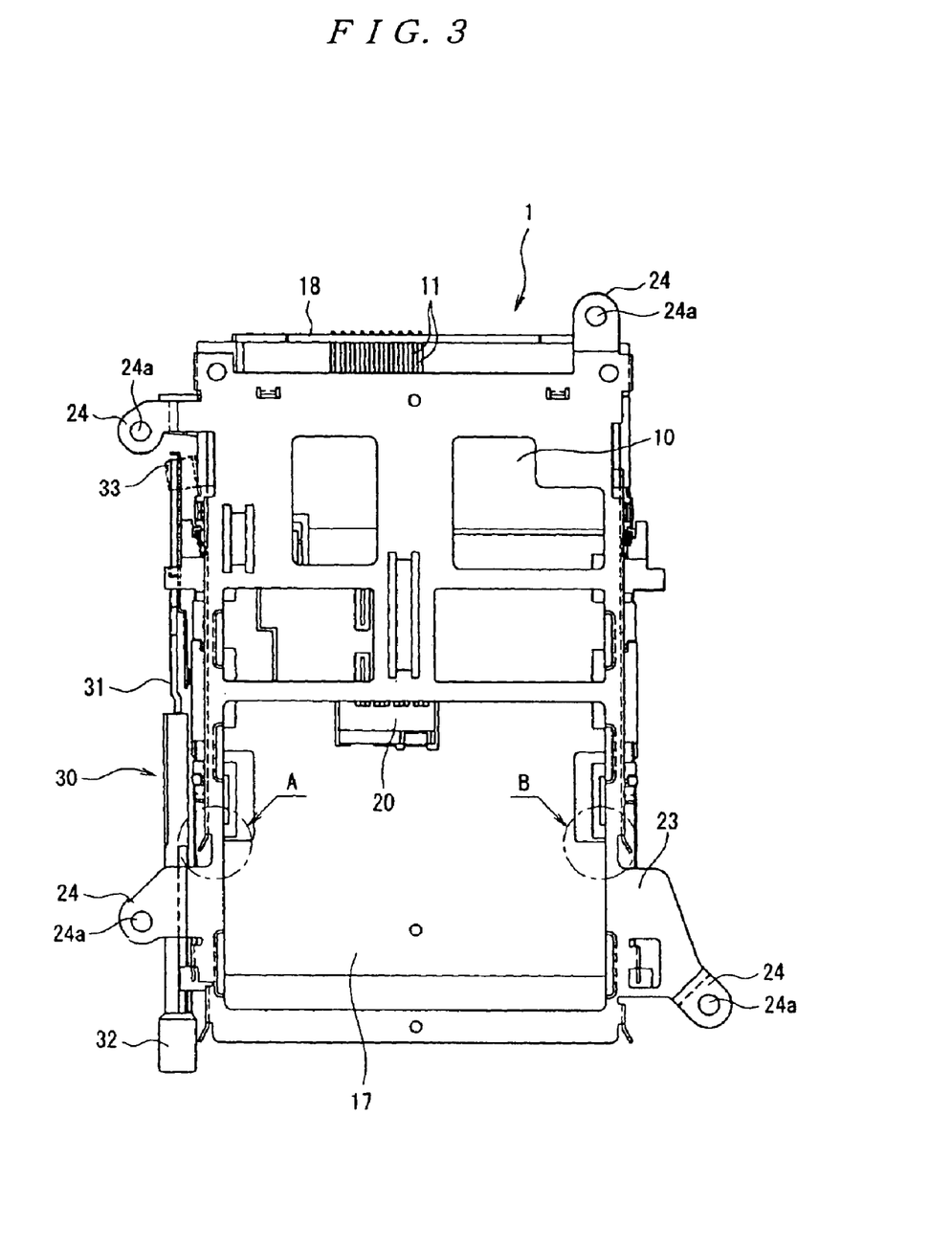
FIG. 3 is a bottom view of the card connector of FIG. 1.

FIGS. 1 through 3 show a card connector 1 that is mounted on a circuit board (not shown). The card connector 1 comprises an IC card receiving portion 10 and a smart card receiving portion 20. The IC card receiving portion 10 is designed to receive a card with a large thickness, such as a PCMCIA standard IC card C1. The smart card receiving portion 20 is designed to receive a card with a thickness smaller than the IC card C1, such as an ISO standard smart card C2. Although the cards described herein are described as being PCMCIA standard IC cards C1 and ISO standard smart cards C2, the cards that are used in the card connector 1 may also be cards other than the PCMCIA standard IC cards C1 and the ISO standard smart cards C2.

As shown in FIG. 1, the IC card receiving portion 10 has a plurality of pin contacts 11 disposed in two rows (upper and lower) along a direction of length (left-right direction in FIG. 1). A first end of the pin contacts 11 is connected to a connector part of the IC card C1, and a second end of the pin contacts 11 is connected by soldering to a relay board 18. The relay board 18 engages with a separate connector (not shown) disposed on a circuit board (not shown). A metal grounding frame 12 is disposed on an upper surface of the IC card receiving portion 10. The grounding frame 12 is connected by attachment screws 13 to a lower-side metal frame 23 at both end portions with respect to the direction of length of the IC card receiving portion 10. A pair of card guide arm parts 14, 15 are disposed on both of the end portions of the card receiving portion 10. As best shown in FIG. 1(B), each of the card guide arm parts 14, 15 is formed with a substantially reverse C-shaped cross-sectional shape. The reverse C-shaped cross-sectional parts of the card guide arm parts 14, 15 form a card guide part 16a that guides the insertion of the IC card C1 into a first receiving slot 16 formed between the card guide arm parts 14, 15. An upper-side metal frame 19 bridges a space between the card guide arm parts 14, 15 and is disposed on an upper side of the first receiving slot 16.

As shown in FIG. 1, the smart card receiving portion 20 has a plurality of pairs of plate spring contacts 21 disposed therein. The plate spring contacts 21 are contacted by terminal parts formed on a surface of the smart card C2. The smart card receiving portion 20 extends from the IC card receiving portion 10 and is disposed on a lower side of the card guide arm parts 14, 15 on an inside with respect to the direction of card insertion (upper side in FIG. 1(A)). A lower-side metal frame 23 is disposed on the lower side of the card guide arm parts 14, 15. The lower-side metal frame 23 defines a second receiving slot 22 for the smart cards C2. As shown in FIG. 3, the lower-side metal frame 23 extends to the lower side of the IC card receiving portion 10 and has a plurality of connector attachment parts 24. Attachment screws (not shown) pass through through-holes 24a formed in each connector attachment part 24 to fasten the card connector 1 to the circuit board (not shown). A partitioning metal frame 17 bridges the space between the card guide arm parts 14, 15 and is installed between the first receiving slot 16 and the second receiving slot 22.

Although the card connector 1 is described as having an upper first receiving slot 16 for receiving an IC card C1 and a lower second receiving slot 22 for receiving a smart card C2, the first and second receiving slots 16, 22 may be alternated such that the smart card C2 is received in the upper receiving slot and the IC card C1 is received in the lower receiving slot. Additionally, the card connector 1 is not limited to only two receiving slots. Any number of receiving slots may be formed therein depending on the desired application.

As shown in FIGS. 1 and 3, an ejection mechanism 30 is disposed on one of the guide arm parts 15 to eject the IC card C1 inserted into the IC card receiving portion 10. The ejection mechanism 30 has a push bar 31 movable in card insertion and an ejection direction along an outside wall surface of the guide arm part 15. A push button 32 is attached to a card insertion end of the push bar 31. An ejection bar 33 is disposed on an end opposite from the card insertion end of the push bar 31. The ejection bar 33 is formed such that when one end is pressed against a tip end of the push bar 31, another end ejects the IC card C1.

As shown in FIGS. 4 through 8, thin card advance checking devices 40, 50 are disposed on the card guide part 16a of the first receiving slot 16 used for the IC card C1. The card advance checking devices 40, 50 are disposed on substantially central portions (portions in the vicinities indicated by arrows A and B in FIG. 3) with respect to the direction of card insertion of the card guide arm parts 15, 14, respectively.

Figure 4:
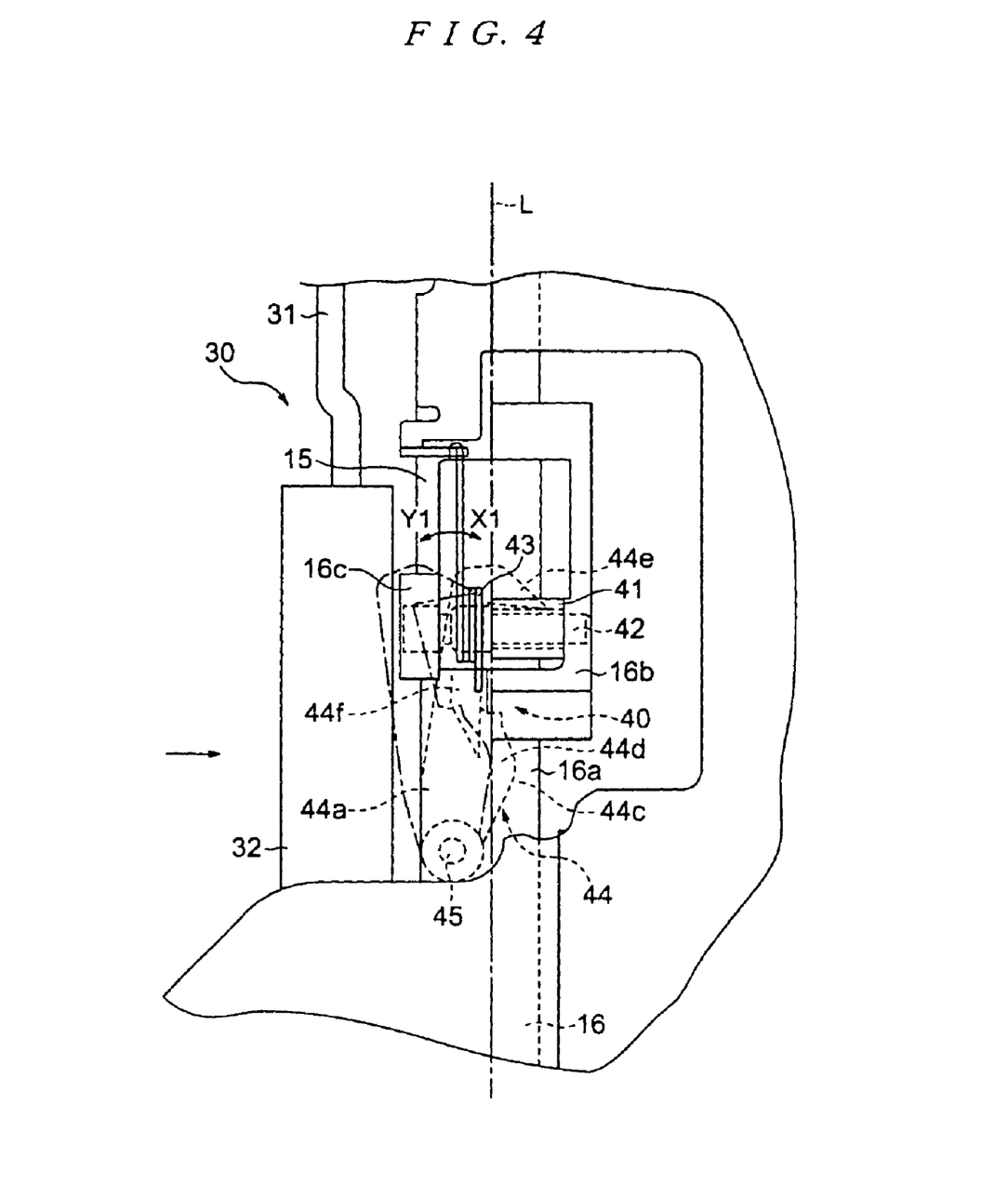
FIG. 4 is an enlarged view of portion A in FIG. 3 where a lower-side metal frame has been removed.
Figure 5:
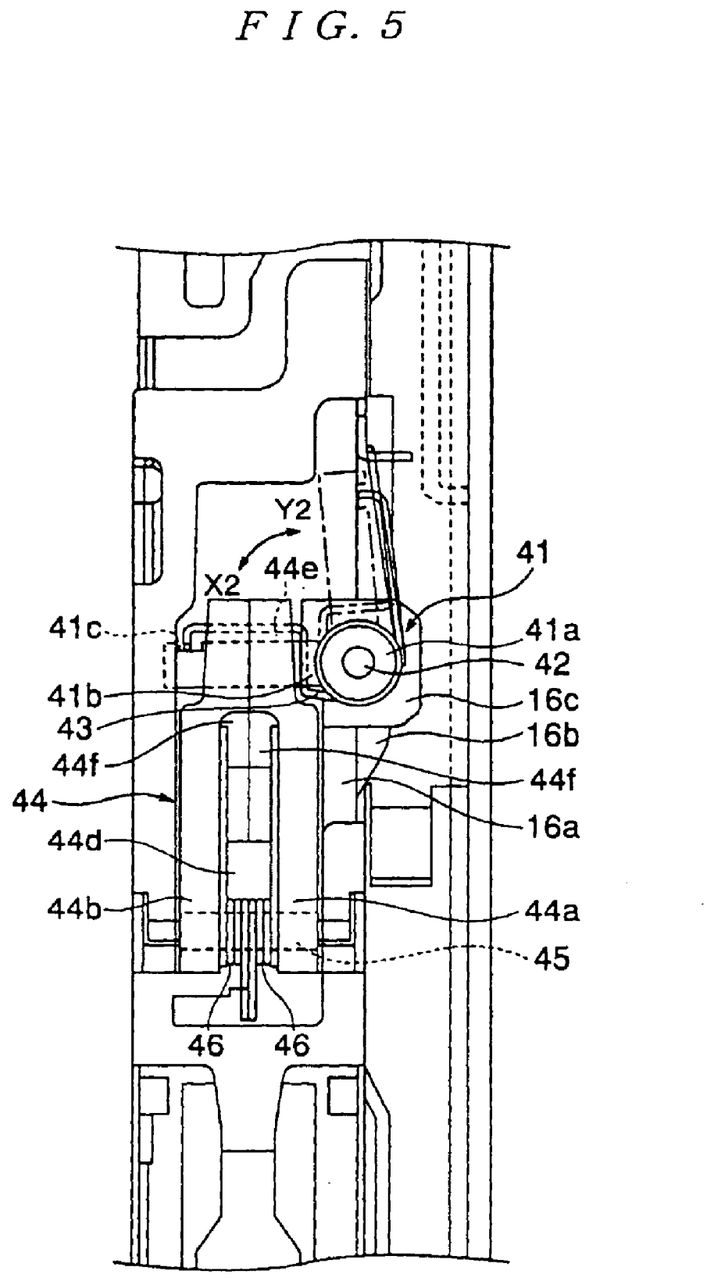
FIG. 5 is a view from a direction of the arrow in FIG. 4.

As shown in FIGS. 4 and 5, the thin card advance checking device 40 on the side of the card guide arm part 15 has a stopper member 41 pivotally shaft-supported on the card guide part 16a of the first receiving slot 16. The stopper member 41 is arranged so that the stopper member 41 can pivot in the directions indicated by arrows X2 and Y2 in FIG. 5 about a supporting shaft 42. The supporting shaft 42 is shaft-supported on both a protruding part 16b, which protrudes downward from the lower wall of the card guide part 16a, and a protruding part 16c, which protrudes downward from the lower wall of the card guide part 16a at a point further to the outside (left side in FIG. 4) than the protruding part 16b. The stopper member 41 is formed by moulding an insulating resin and has a pivoting part 41a that pivots about a circumference of the supporting shaft 42. A stopper part 41b extends from the pivoting part 41a. A torsion spring 43 is wound around the circumference of the supporting shaft 42. One end of the torsion spring 43 is anchored in a recessed part 41c formed in the stopper part 41b such that the torsion spring 43 constantly urges the stopper member 41 in the direction indicated by the arrow X2. Alternatively, instead of the torsion spring 43, the spring that drives the stopper member 41 may be a plate spring or coil spring, etc. When the stopper member 41 pivots in the direction indicated by the arrow X2, the stopper member 41 pivots to a first position where the stopper member 41 blocks the direction of advance of the IC card C1 and the smart card C2. When the stopper member 41 pivots in the direction indicated by the arrow Y2, the stopper member 41 pivots to a second position where the direction of advance of the IC card C1 and the smart card C2 is unblocked.

A cam member 44 is pivotally shaft-supported on the card guide part 16a perpendicular to the supporting shaft 42 of the stopper member 41. The cam member 44 is constructed from two cam members 44a, 44b that have a symmetrical structure. The cam member 44a is disposed on a lower side, and the cam member 44b is disposed on an upper side. The cam members 44a, 44b are arranged to pivot in the directions indicated by the arrows X1 and Y1 in FIG. 4 about a supporting shaft 45. The supporting shaft 45 is shaft-supported on both the upper wall and lower wall of the card guide part 16a. Each of the cam members 44a, 44b has a cam surface 44c that is cam-engaged with the side surface of the IC card C1 on the side of the first receiving slot 16. As shown in FIG. 4, the cam surfaces 44c protrude further toward the first receiving slot 16 than a card guide line L in the card guide part 16a in a state in which the cam member 44 has pivoted in the X1 direction. In a state in which the cam members 44a, 44b are attached to the supporting shaft 45 symmetrically above and below, the cam members 44a, 44b define a space 44d that allows the advance of the smart card C2 into the central portion with respect to a vertical direction adjacent to the cam surfaces 44c. Claws 44e check the pivoting of the stopper member 41 in the first position when the cam members 44a, 44b have pivoted in the X1 direction. The claws 44e are formed on tip ends of the respective cam members 44a, 44b. Two torsion springs 46 are wound around the circumference of the supporting shaft 45. One end of each of the torsion springs 46 is engaged with one of two anchoring parts 44f, 44f formed on the cam members 44a, 44b such that the cam members 44a, 44b are constantly urged in the direction indicated by the arrow X1. Alternatively, instead of torsion springs, the springs that drive the cam member 44 may alternatively be plate springs or coil springs, etc.

Figure 6:
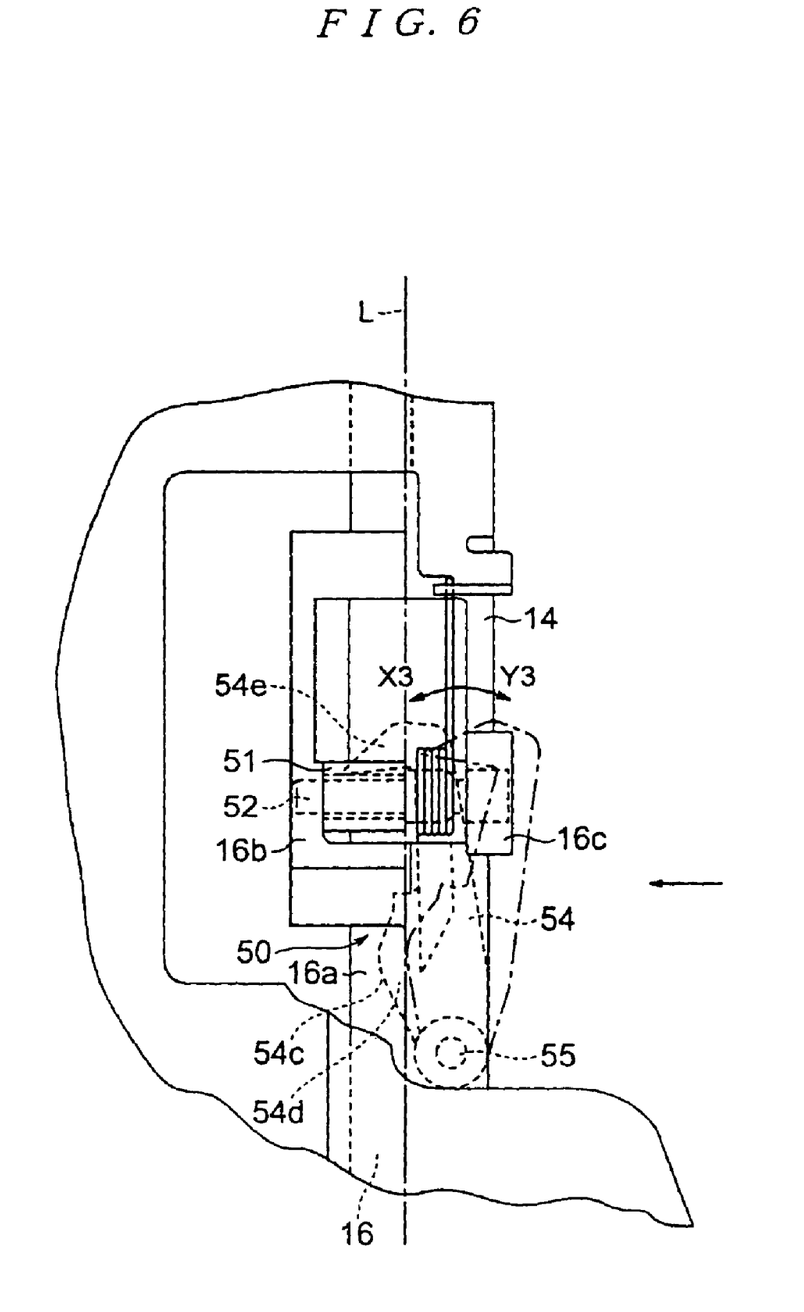
FIG. 6 is an enlarged view of portion B in FIG. 3 where the lower-side metal frame has been removed.
Figure 7:
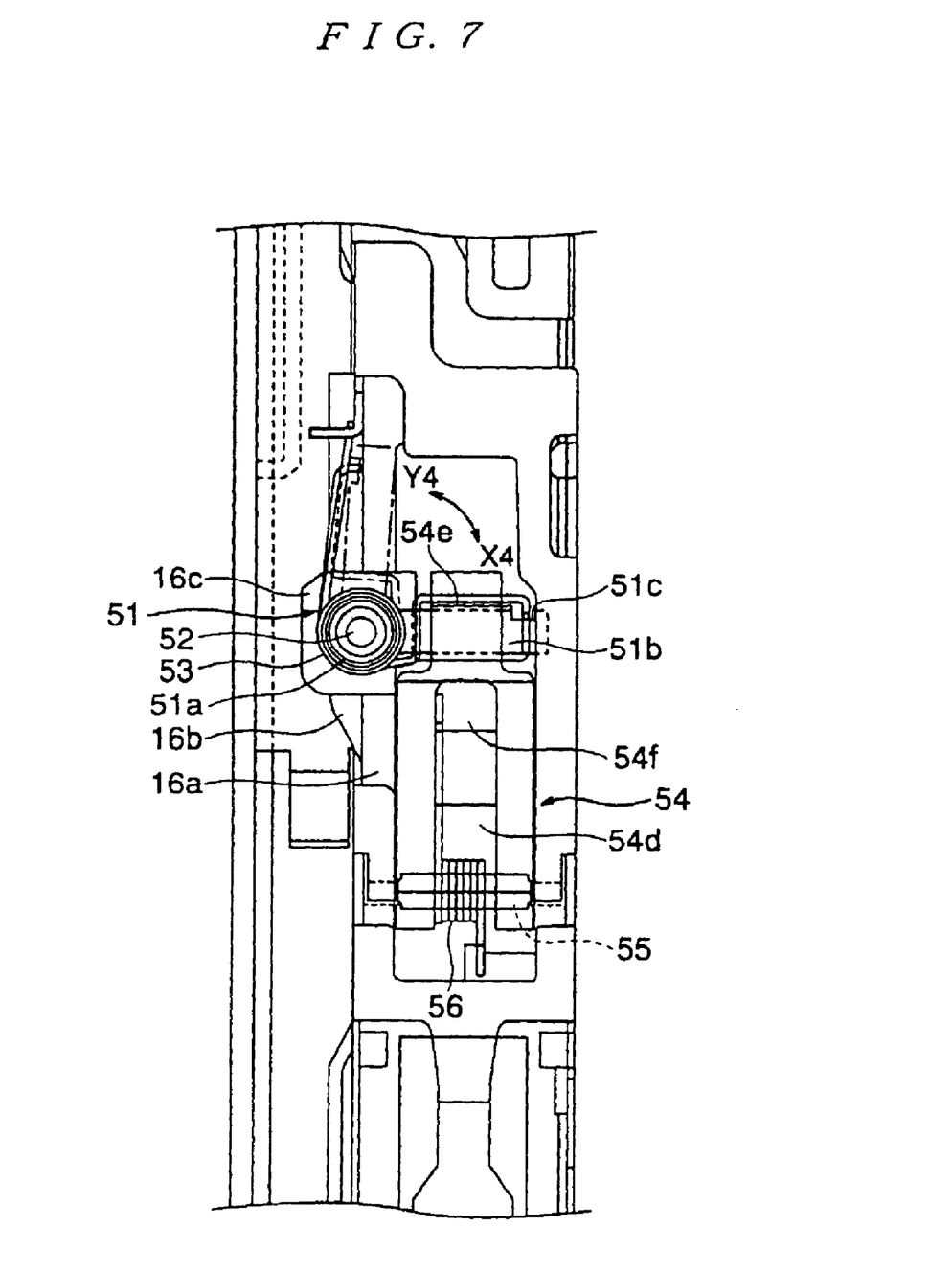
FIG. 7 is a view seen from a direction of the arrow in FIG. 6.

As is shown in FIGS. 6 and 7, the thin card advance checking device 50 on the side of the card guide arm part 14 has a stopper member 51 that is pivotally shaft-supported on the card guide part 16 a of the first receiving slot 16. Like the stopper member 41, the stopper member 51 is arranged so that the stopper member 51 can pivot in the directions indicated by arrows X4 and Y4 in FIG. 7 about a supporting shalt 52. The supporting shaft 52 is shaft-supported On both a protruding part 16b, which protrudes downward from the lower wall of the card guide part 16a, and a protruding part 16c, which protrudes downward from the lower wall of the card guide part 16a at a point further to the outside (right side in FIG. 6) than the protruding part 16b. The stopper member 51 is formed by moulding an insulating resin and has a pivoting part 51a, which pivots about a circumference of the supporting shaft 52. A stopper part 51b extends from the pivoting part 51a. A torsion spring 53 is wound around the circumference of the supporting shaft 52. One end of the torsion spring 53 is anchored in a recessed part 51c formed on the stopper part 51b such that the stopper member 51 is constantly urged in the direction indicated by the arrow X4. Alternatively, instead of the torsion spring 43, the spring that drives the stopper member 51 may be a plate spring or coil spring, etc. When the stopper member 51 pivots in the direction indicated by the arrow X4, the stopper member 51 pivots to a first position where the stopper member 51 blocks the direction of advance of the IC card C1 and the smart card C2. When the stopper member 51 pivots in the direction indicated by the arrow Y4, the stopper member 51 pivots to a second position where the direction of the IC card C1 and the smart card C2 is unblocked.

A cam member 54 is pivotally shaft-supported on the card guide part 16a perpendicular to the supporting shaft 52 of the stopper member 51. Unlike the cam member 44, the cam member 54 is constructed as a single body and has a structure that is symmetrical with the cam member 44 in the left-right direction. The cam member 54 is arranged so that the cam member 54 can pivot in the directions indicated by arrows X3 and Y3 in FIG. 6 about a supporting shaft 55 shaft-supported on both the upper wall and lower wall of the card guide part 16a. The cam member 54 has a cam surface 54c that is cam-engaged with the side surface of the IC card C1 on a side of the first receiving slot 16. As shown in FIG. 6, the cam surface 54c protrudes further toward the first receiving slot 16 than the card guide line L in the card guide part 16a when the cam member 54 has pivoted in the X3 direction. The cam member 54 has a space 54d that allows advancement of the smart card C2 in a central portion with respect to the vertical direction adjacent to the cam surface 54c. A claw 54e checks the pivoting of the stopper member 51 in the first position when the cam member 54 has pivoted in the X3 direction. The claw 54e is formed on a tip end of the cam member 54. A torsion spring 56 is wound around the circumference of the supporting shaft 55. One end of the torsion spring 56 is engaged with an anchoring part 54f formed on the cam member 54 such that the cam member 54 is constantly urged in the direction indicated by the arrow X3.

Alternatively, instead of a torsion spring, the spring that drives the cam member 54 may alternatively be a plate spring or a coil spring, etc.

The operation of the thin card advance checking device 40 will now be described in greater detail with reference to FIG. 8. Because the operation of the thin card advance checking device 50 is substantially the same as the operation of the thin card advance checking device 40, a description of the operation of the thin card advance checking device 50 will not be described herein.

In a state in which no cards C1, C2 are inserted in the card connector 1, the stopper part 41b of the stopper member 41 is urged in the X2 direction to the first position such that the stopper member 41 is located in the first position (shown by the solid line in FIG. 5) where the stopper member 41 blocks the advance of the IC card C1 and the smart card C2. At the same time, both of the cam members 44a, 44b are urged in the X1 direction so that the claws 44e check the stopper member 41 in the first position (shown by the broken line in FIG. 4). In this state, the cam surface 44c protrudes further toward the first receiving slot 16 than the card guide line L in the card guide part 16a.

Figures 8A, 8C:
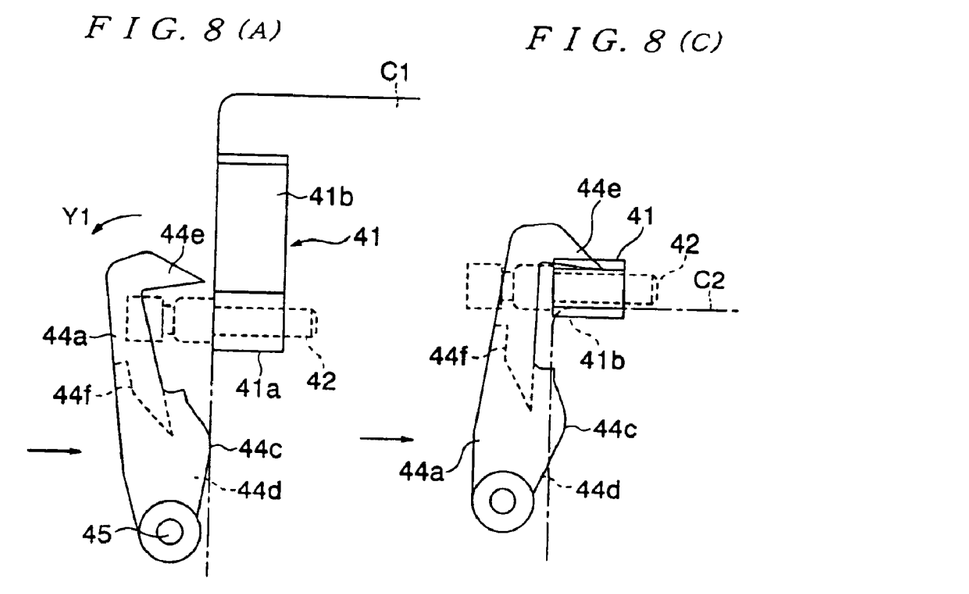
FIG. 8(A) is a schematic plan view of the operating state of the thin card advance checking device when a IC card is inserted.
FIG. 8(C) is a schematic plan view of the operating state of the thin card advance checking device when the smart card is inserted.
Figure 8B:
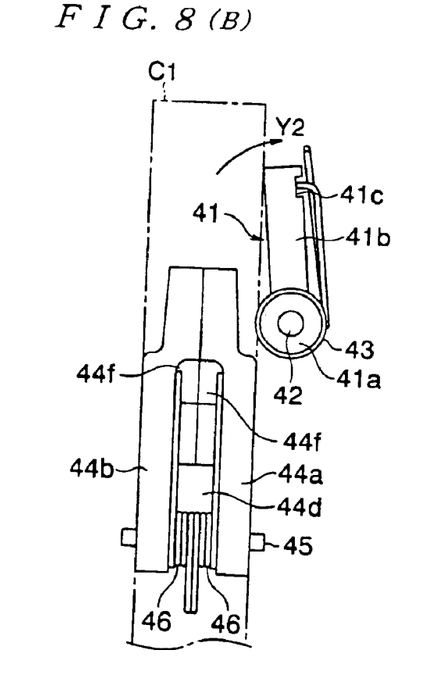
FIG. 8(B) is a schematic side view of the operating state of the thin card advance checking device when the IC card is fully inserted.

When the IC card C1 is inserted into the first receiving slot 16, the side surface of the IC card C1 is guided along the card guide line L. A tip end of the IC card C1 contacts the cam surfaces 44c of the cam members 44a, 44b. As the IC card C1 is inserted further, the cam members 44a, 44b pivot out of the first receiving slot 16 in the Y1 direction and contact between the side surface of the IC card C1 and the cam surface 44c is maintained by a spring force of the torsion spring 46, as shown in FIG. 8(A). As the cam members 44a, 44b pivot in the direction of the arrow Y1, the claws 44e are released from the stopper part 41b and the stopper member 41 is caused to pivot in the Y2 direction toward the second position by the undersurface of the IC card C1, as shown in FIG. 8(B), thus allowing the IC card C1 to advance further within the first receiving slot 16. When the IC card C1 is fully inserted, the IC card C1 mates with the IC card receiving portion 10 so that the connector part of the IC card C1 and the pin contacts 11 of the IC card receiving portion 10 are electrically connected to each other.

Figure 8D:
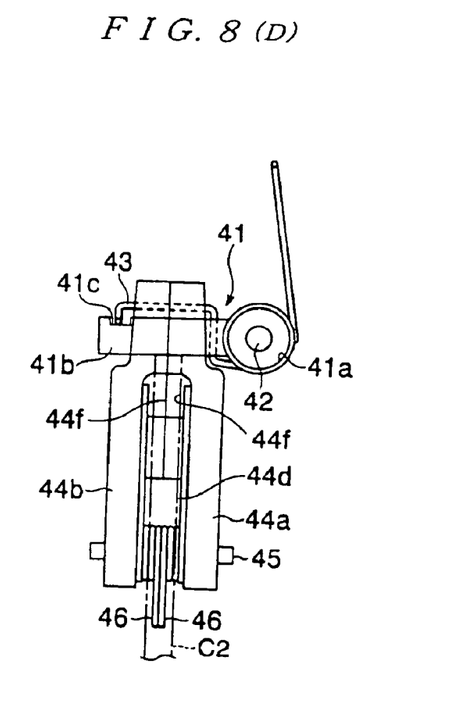
FIG. 8(D) is a schematic side view of the operating state of the thin card advance checking device when the smart card is fully inserted.

When the smart card C2 is inserted into the second receiving slot 22, the smart card C2 is received in the smart card receiving portion 20, and the terminal parts of the smart card C2 contact the plurality of pairs of plate spring contacts 21, so that the terminal parts and contacts are electrically connected. When the smart card C2 is erroneously inserted into the first receiving slot 16, the smart card C2 passes through the space 44d between the cam members 44a, 44b. The smart card C2 passes through the space 44d even though the cam surfaces 44c of the cam members 44a, 44b protrude further toward the first receiving slot 16 than the card guide line L, as shown in FIG. 8(C). When advanced further, a tip end of the smart card C2 comes into contact with the stopper part 41b of the stopper member 41 that is in the first position to check advancement of the smart card C2, as shown in FIG. 8(D). Since the pivoting of the stopper member 41 is checked in the first position by the claws 44e of the cam members 44a, 44b, the advance of the thinner smart card C2 into the interior of the first receiving slot 16 formed for the thicker IC cards C1 is prevented.

As such, the thin card advance checking devices 40, 50 prevent the erroneous insertion of the thinner smart cards C2 into the first receiving slot 16 formed for receipt of the thicker IC cards C1. The thin card advance checking devices 40, 50 are formed by a simple construction with a low height such that the card connector 1 can be inexpensively manufactured. Further, the thin card advance checking device 40 has two cam members 44a, 44b installed side by side. Accordingly, the stopper member 41 can not be caused to pivot from the first position into the second position unless both of the cam members 44a, 44b are simultaneously caused to pivot. Thus, when the smart card C2 is received in the first receiving slot 16, the probability that both of the cam members 44a, 44b will be simultaneously caused to pivot is extremely low, even in cases where the smart card C2 misses the space 44d and engages with one of the cam members 44a, 44b. In this instance, the stopper member 41 remains in the first position to ensure that the advance of the smart card C2 is prevented.

Additionally, the cam surfaces 44c, 54c of the cam members 44a, 44b, 54, respectively, are disposed facing key parts on both corners of the tip end of the IC card C1. Accordingly, when the IC card C1 is inserted in the regular direction, the key parts contact all of the cam surfaces 44c, 54c and cause the cam members 44a, 44b, 54 to pivot. On the other hand, in cases where the IC card C1 is inserted upside down, the key parts do not contact all of the cam surfaces 44c, 54c. In this instance, at least one of the cam members 44a, 44b, 54 does not pivot and insertion of the upside down IC card C1 is prevented. Furthermore, since there is no need to form cut-outs, etc., in the IC cards C1 or smart cards C2, the invention may be applied to ordinary cards without any modifications thereto.

The foregoing illustrates some of the possibilities for practicing the invention. Many other embodiments are possible within the scope and spirit of the invention. For example, the two cam members 44a, 44b are installed only in the thin card advance checking device 40 on the side of the ejection mechanism 30, however, it would also be possible to construct the thin card advance checking device 50 with two cam members or to construct only the thin card advance checking device 50 with two cam members. Alternatively, both thin card advance checking devices 40, 50 could be constructed using a single cam member 54. It would also be possible to install a thin card advance checking device 40, 50 on only one of the guide arm parts 14, 15. It is, therefore, intended that the foregoing description be regarded as illustrative rather than limiting, and that the scope of the invention is given by the appended claims together with their full range of equivalents.

I claim:

1. A card connector having a first receiving slot for receiving a first card, and a second receiving slot for receiving a second card that has a thickness smaller than the first card, comprising:
   a stopper member supported in the first receiving slot by a supporting shaft, the stopper member pivots between a first position where the stopper member blocks the first receiving slot to prevent advancement of the first or second card, and a second position where advancement of the first or second card is unblocked; and
   a cam member having a claw that abuts the stopper member to prevent the stopper member from pivoting to the second position and a cam surface that releases the claw from the stopper member when cam-engaged by the first card.

2. The card connector of claim 1, wherein the cam member is pivotally supported in the first receiving slot by a supporting shaft arranged perpendicular to the supporting shaft of the stopper member.

3. The card connector of claim 1, wherein the stopper member is biased toward the first position.

4. The card connector of claim 3, wherein the stopper member is biased by a torsion spring wound around the supporting shaft.

5. The card connector of claim 1, wherein the claw is biased against the stopper member by a torsion spring.

6. The card connector of claim 1, wherein the cam member has symmetrical first and second halves and a space for receiving the second card is formed between the cam surfaces of the halves.

7. The card connector of claim 1, wherein the cam surface protrudes into the first receiving slot.

8. The card connector of claim 1, further comprising a second stopper member and member a second cam arranged on an opposite side of the first receiving slot.

9. A card advance checking device, comprising:
   a stopper member supported in a card receiving slot by a supporting shaft, the stopper member pivots between a first position where the stopper member blocks the card receiving slot to prevent advancement of a card therein, and a second position where advancement of the card therein is unblocked; and
   a cam member pivotally supported in the card receiving slot by a supporting shaft arranged perpendicular to the supporting shaft of the stopper member, the cam member having a claw that abuts the stopper member to prevent the stopper member from pivoting to the second position, the cam member having a cam surface positioned such that when the card has a desired thickness, the cam member is cam-engaged by the card to release the claw from the stopper member.

10. The card advance checking device of claim 9, wherein the stopper member is biased toward the first position.

11. The card advance checking device of claim 9, wherein the claw is biased against the stopper member by a torsion spring.

12. The card advance checking device of claim 9, wherein the cam member has symmetrical first and second halves and a space for receiving the card with a thickness less than the desired thickness is formed between the cam surfaces of the first and second halves.

13. The card advance checking device of claim 9, wherein the cam surface protrudes into the card receiving slot.

14. The card advance checking device of claim 9, further comprising a second stopper member and a second cam member arranged on an opposite side of the card receiving slot.

* * * * *